Patented Nov. 30, 1926.

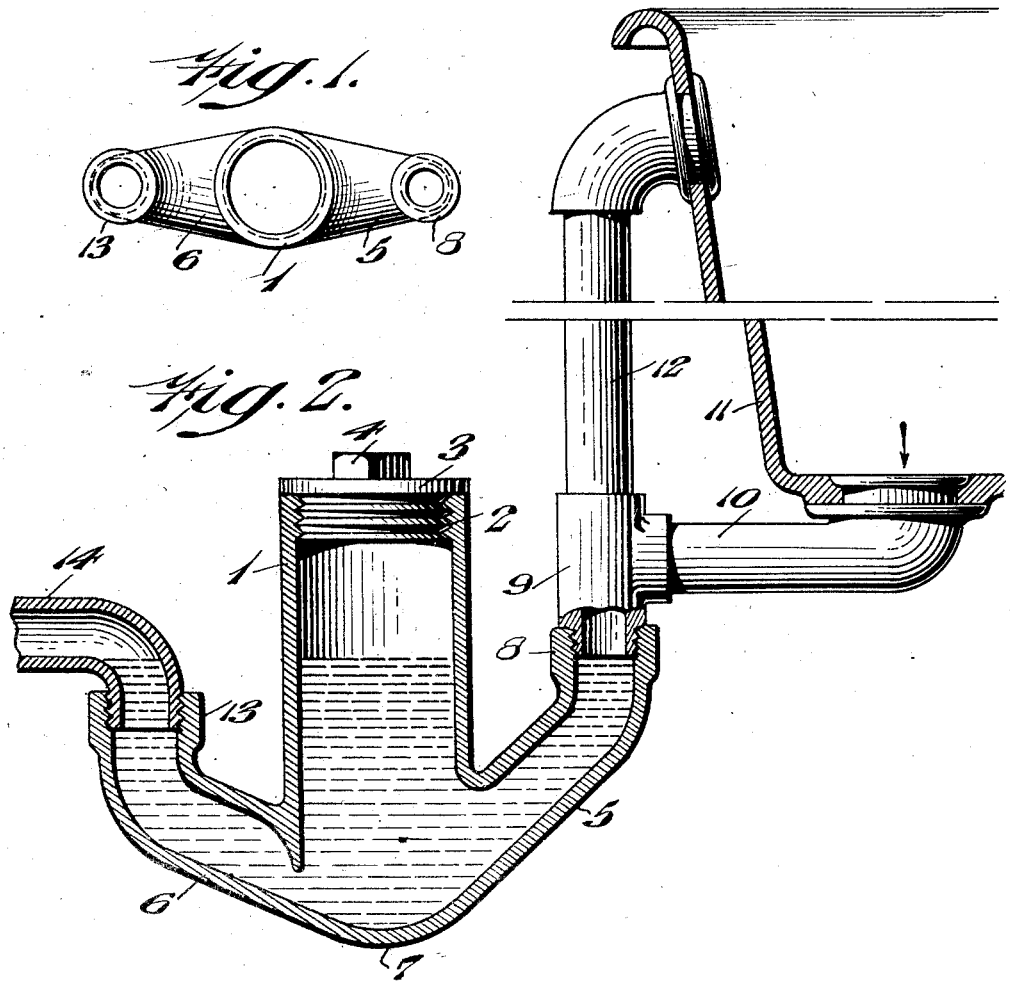

1,608,929

UNITED STATES PATENT OFFICE.

HENRY EDELMAN, OF PHILADELPHIA, PENNSYLVANIA, ASSIGNOR OF ONE-HALF TO PAULINE EDELMAN, OF PHILADELPHIA, PENNSYLVANIA.

BATH TRAP.

Application filed August 25, 1925. Serial No. 52,287.

This invention, generally stated, relates to so-called bath traps, sinks, etc., and has more particular relation to a trap for use in connection with so-called sanitary plumbing.

The leading object of the present invention is to provide a trap of the character stated provided with a clean-out positioned upon the top of the trap so as to provide ready access from above for cleaning those passages located upon each side of the clean-out.

A further object is to provide a trap of the character stated which is simple in structure and may be cheaply manufactured and in which the interior construction is such that not only a good seal is provided but few, if any, corners are present for the collection of dirt and filth.

Other and further objects not at this time appearing will be hereinafter more fully described.

The invention consists of the novel construction hereinafter described and finally claimed.

The nature, characteristic features and scope of the invention will be more fully understood from the following description taken in connection with the accompanying drawings froming part hereof, and in which:

Fig. 1, is a view in plan of a trap embodying the invention, and

Fig. 2, is a fragmentary view principally in central section of a bath tub equipped with a trap embodying the invention.

For the purpose of illustrating my invention I have shown in the accompaning drawings, one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in detail, the reference numeral 1 designates a central clean-out interiorly screw threaded at its top as at 2 to accommodate a removable screw threaded plug 3, the latter being provided with a squared portion 4 for tool accommodation. As clearly shown in Fig. 2, the central clean-out 1 is vertically disposed and is relatively high. In communication with the central clean-out 1 and upon each side thereof are a pair of branches designated 5 and 6 respectively. These branches 5 and 6 each taper from the central clean-out 1 as clearly shown in Fig. 1. That part of the outer casing immediately below the clean-out 1 and which is designated 7 in the drawings is rounded and is depressed so that a considerable body of water may be contained within the clean-out 1. The branch 5 is provided with a socket 8 interiorly screw threaded to accommodate a union 9 which communicates with the drain 10 of a bath tub 11 and with the overflow connection 12 from the bath tub. The branch 6 is provided with a socket 13 internally screw threaded to accommodate the waste pipe 14. In practice the removable cap or cover 3 of the central clean-out is approximately flush with the floor so that the trap may be readily cleaned after the cap 3 is removed, since if either the branch 5 or the branch 6 becomes clogged, probing instruments may be easily inserted from above. Among the advantages derived from the trap of this kind is that the trap is provided with a good seal; a self scouring trap is provided; a re-sealing trap is provided; the clean-out is under seal and is so positioned that the union of the waste and overflow pipes may be readily probed; it may be used for either lead pipe or iron pipe connections; and can be conveniently used in conjunction with concrete flooring.

Having thus described my invention, what I claim as new and desire to secure by Letters Patent, is:

A bath trap including its complemental waste pipe comprising a vertically disposed, central cleanout of relatively large diameter having an internally screw threaded portion at its top, a cover engaging said screw-threaded portion, inlet and outlet branch connections of different lengths and each of smaller cross-sectional area than said central cleanout extending upwardly at different angles from the said central cleanout, which cleanout has a concaved lower wall 7 arranged immediately below said cleanout, which wall is common to the junction of both branches, each branch terminating in a vertically extended screw-threaded socket the vertical axis of which parallels the vertical axis of said central cleanout, said cleanout, branches and sockets being integral and forming an unbroken continuity, the wall of said cleanout nearest the waste pipe connection extending for an appreciable distance below the cleanout proper and across the mouth of the waste pipe connection branch to form an opening the cross-sectional area of which is appreciably smaller than the other openings in the trap.

HENRY EDELMAN.